United States Patent
Li

(10) Patent No.: US 9,817,265 B2
(45) Date of Patent: Nov. 14, 2017

(54) DISPLAY PANEL AND DISPLAY DEVICE

(71) Applicant: BOE TECHNOLOGY GROUP CO., LTD., Beijing (CN)

(72) Inventor: Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 71 days.

(21) Appl. No.: 14/895,099

(22) PCT Filed: Jun. 24, 2015

(86) PCT No.: PCT/CN2015/082149
§ 371 (c)(1),
(2) Date: Dec. 1, 2015

(87) PCT Pub. No.: WO2016/107105
PCT Pub. Date: Jul. 7, 2016

(65) Prior Publication Data
US 2016/0342021 A1 Nov. 24, 2016

(30) Foreign Application Priority Data
Dec. 30, 2014 (CN) .......................... 2014 1 0850930

(51) Int. Cl.
*G02F 1/1335* (2006.01)
*G02F 1/1343* (2006.01)
*G02F 1/1362* (2006.01)

(52) U.S. Cl.
CPC .... *G02F 1/133528* (2013.01); *G02F 1/13439* (2013.01); *G02F 1/133512* (2013.01);
(Continued)

(58) Field of Classification Search
CPC ... G02F 1/133615; G02F 2001/133548; G02F 2202/22
See application file for complete search history.

(56) References Cited

U.S. PATENT DOCUMENTS 7,355,661 B2 * 4/2008 Hong .................... G02B 6/005
349/158
8,081,273 B2 * 12/2011 Choo ................ G02F 1/133536
349/100
(Continued)

FOREIGN PATENT DOCUMENTS

CN 1641428 A 7/2005
CN 1655021 A 8/2005
(Continued)

OTHER PUBLICATIONS

International Search Report of PCT/CN2015/082149 in Chinese, dated Oct. 12, 2015 with English translation.
(Continued)

*Primary Examiner* — Kendrick Hsu
(74) *Attorney, Agent, or Firm* — Collard & Roe, P.C.

(57) ABSTRACT

A display panel and a display device are disclosed. The display panel includes an upper substrate (1) and a lower substrate (2) that are disposed opposite to each other; a liquid crystal layer (5) provided between the upper substrate (1) and the lower substrate (2); and a common electrode (3) provided on a side of the liquid crystal layer (5). The common electrode (3) has a wire gating polarizing structure that forms an polarization analyzer structure or a polarizer structure. Upon the common electrode (3) being applied for polarizing the light or analysis of light polarization, a polarizer or a polarization analyzer can be omitted in the display panel, which can reduce numbers of layered structures in the display panel and hence reduce a thickness of the display device.

7 Claims, 2 Drawing Sheets

(52) U.S. Cl.
CPC .. *G02F 1/133514* (2013.01); *G02F 1/134363* (2013.01); *G02F 1/136286* (2013.01); *G02F 2001/133531* (2013.01); *G02F 2001/133548* (2013.01); *G02F 2001/134318* (2013.01); *G02F 2201/121* (2013.01); *G02F 2201/123* (2013.01); *G02F 2202/22* (2013.01)

(56) References Cited

U.S. PATENT DOCUMENTS

| 2001/0015784 | A1 | 8/2001 | Gu | |
|---|---|---|---|---|
| 2012/0057106 | A1* | 3/2012 | Park | G02F 1/133528 349/96 |
| 2014/0293187 | A1* | 10/2014 | Nam | G02F 1/13362 349/62 |
| 2015/0014693 | A1* | 1/2015 | Lee | H01L 27/124 257/72 |

FOREIGN PATENT DOCUMENTS

| CN | 104503165 A | 4/2015 |
|---|---|---|
| KR | 10-2012-0072194 A | 7/2012 |

OTHER PUBLICATIONS

Notice of Transmittal of the International Search Report of PCT/CN2015/082149 in Chinese, dated Oct. 12, 2015.

Written Opinion of the International Searching Authority of PCT/CN2015/082149 in Chinese, dated Oct. 12, 2015 with English translation.

* cited by examiner

DISPLAY PANEL AND DISPLAY DEVICE

CROSS REFERENCE TO RELATED APPLICATIONS

This application is the National Stage of PCT/CN2015/082149 filed on Jun. 24, 2015, which claims priority under 35 U.S.C. §119 of Chinese Application No. 201410850930.6 filed on Dec. 30, 2014, the disclosure of which is incorporated by reference.

TECHNICAL FIELD

Embodiments of the present invention relate to a display panel and a display device.

BACKGROUND

In the technology of the art, a display device includes a display panel and a backlight module. The display panel includes a plurality of layered structures such as an upper substrate, a lower substrate, a liquid crystal layer provided between the upper substrate and the lower substrate, an array layer, a color film layer, a common electrode, a polarizer disposed on a light-entering side of the liquid crystal layer and a polarization analyzer disposed on a light-emitting side of the liquid crystal layer, which can lead to a relative large thickness of the whole display device. Therefore, designing a thin display device is by far one of the technical problems that are needed to be solved by those skilled in the art.

SUMMARY

A display panel is provided in one embodiment of the present invention and the display panel includes an upper substrate and a lower substrate that are disposed opposite to each other; a liquid crystal layer provided between the upper substrate and the lower substrate; and a common electrode located on a side of the liquid crystal layer; wherein the common electrode has a wire gating polarizing structure that forms a polarization analyzer structure or a polarizer structure.

A display device is provided in another embodiment of the present invention and the display device comprises the display panel mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and, it is not limitative to the scope of the present invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
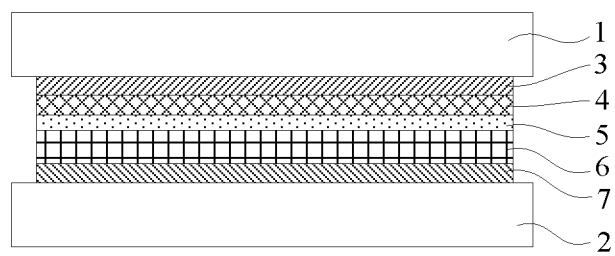
FIG. 1 is a schematic view of a structure of a display panel in an embodiment of the present invention.
Figure 2:
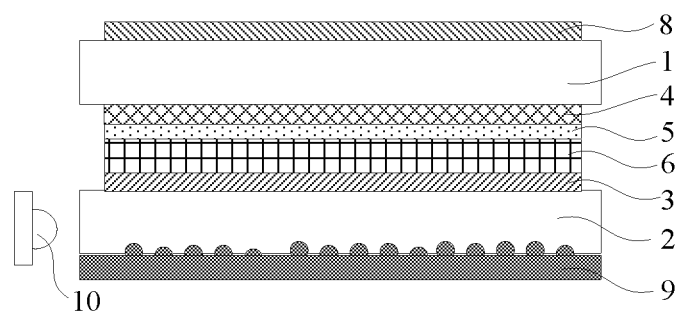
FIG. 2 is a schematic view of a structure of a display device in an embodiment of the present invention.
Figure 3:
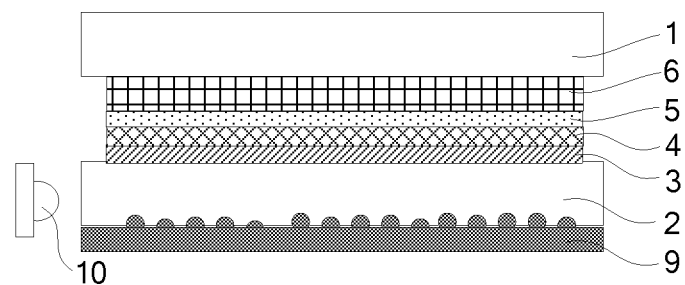
FIG. 3 is a schematic view of a structure of another display device in an embodiment of the present invention.
Figure 4:
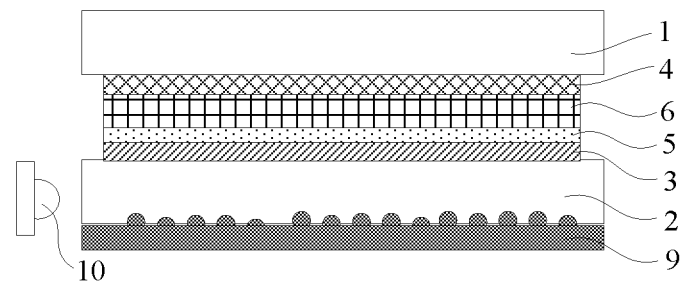
FIG. 4 is a schematic view of a structure of another display device in an embodiment of the present invention.

Please refer to FIGS. 1-4. FIG. 1 is a schematic view of a structure of a display panel in an embodiment of the present invention; FIG. 2 is a schematic view of a structure of a display device in an embodiment of the present invention; FIG. 3 is a schematic view of a structure of another display device in an embodiment of the present invention; FIG. 4 is a schematic view of a structure of another display device in an embodiment of the present invention.

As illustrated in FIG. 1, a display panel provided in the embodiment of the present invention includes an upper substrate 1 and a lower substrate 2 that are disposed opposite to each other, a liquid crystal layer 5 disposed between the upper substrate 1 and the lower substrate 2, and a common electrode 3 provided on a side of the liquid crystal layer 5. The common electrode 3 has a wire gating polarizing structure that forms a polarization analyzer structure or a polarizer structure.

The common electrode 3 in the above display panel has a wire gating polarizing structure that forms a polarization analyzer structure or a polarizer structure and hence the common electrode 3 can be used for polarizing or polarization analysis of light. A polarizer structure can be omitted in the display panel upon the common electrode 3 being used for polarizing the light; and an polarization analyzer structure can be omitted in the display panel upon the common electrode 3 being used for polarization analysis of the light. In summary, the display panel mentioned above can omit a polarization analyzer or a polarizer, which can reduce numbers of layers in the structure of a display panel and hence reduce a thickness of a display panel.

In a specific embodiment as illustrated in FIG. 1, the common electrode 3 in a display panel is disposed on a side of the liquid crystal layer 5 facing the upper substrate and forms a polarization analyzer structure and a polarizer 7 is disposed on a side of the liquid crystal layer 5 facing the lower substrate 2.

In the display panel mentioned above, the common electrode 3 is provided between the upper substrate 1 and the liquid crystal layer 5 and the common electrode 3 can be used for polarization analysis of light. Therefore, a polarization analyzer can be omitted in the display panel, thus making the thickness of the display panel reduced.

As illustrated in FIG. 1, in some embodiments, a polarizer 7 can be a wire gating polarizing film.

As illustrated in FIG. 1, in some embodiments, the display panel mentioned above can also include a color film layer 4 and an array layer 6. The color film layer 4 can be provided between the common electrode 3 and the liquid crystal layer 5 while the array layer 6 can be disposed between the polarizer 7 and the liquid crystal layer 5. In the embodiment of the present invention, the color film layer 4 includes, for example, a color filter and a black matrix. The color filter includes, for example, a red color filter, a green color filter, and a blue color filter. The array layer 6 includes, for example, thin film transistors arranged in an array and the like.

As illustrated in FIG. 2, FIG. 3 and FIG. 4, in the display panel according to some other embodiments, the common electrode 3 is provided on a side of the liquid crystal layer 5 facing the lower substrate 2 and forms a polarizer structure.

As illustrated in FIG. 2, FIG. 3 and FIG. 4, in the display panel, the common electrode 3 is provided between the lower substrate 2 and the liquid crystal layer 5, which can be used for polarizing the light and therefore, a polarizer can be omitted in the display panel, and hence a thickness of the display panel can be reduced. In addition, disposing the common electrode 3 on a position between the lower substrate 2 and the liquid crystal layer 5 can also avoid adverse influence on a display area due to reflection of light by the wire gating polarizing structure in the common electrode 3.

As illustrated in FIG. 2, in some embodiments, the display panel further includes a antistatic layer 8 disposed on a side of the upper substrate 1 facing away from the lower substrate 2. The antistatic layer 8 can shield static electricity and prevent the static electricity from disturbing liquid crystals in a liquid crystal cell.

In some embodiments, the antistatic layer 8 can have a wire gating polarizing structure that forms an polarization analyzer structure. The wire gating polarizing structure of the antistatic layer 8 can be applied in polarization analysis of light. Therefore, besides effectively avoiding static electricity disturbances, an polarization analyzer can also be omitted in the display panel mentioned above, and hence making the thickness of the display panel less.

Upon a common electrode forming a polarizer structure, in some embodiments, the display panel further include an array layer 6 and a color film layer 4, wherein the positional relationships of the array layer 6 and the color film layer 4 can be as follows.

First mode: as illustrated in FIG. 3, the color film layer 4 is provided between the common electrode 3 and the liquid crystal layer 5 while the array layer 6 is provided between the upper substrate 1 and the liquid crystal layer 5.

Second mode: as illustrated in FIG. 2, the color film layer 4 is provided between the liquid crystal layer 5 and the upper substrate 1 while the array layer 6 is provided between the common electrode 3 and the liquid crystal layer 5.

Third mode: as illustrated in FIG. 4, the color film layer 4 is provided between the liquid crystal layer 5 and the upper substrate 1 while the array layer 6 is provided between the color film layer 4 and the liquid crystal layer 5.

Upon the common electrode being provided between the liquid crystal layer 5 and the lower substrate 2, in some embodiments, the display panel mentioned above further includes a plurality of crossly arranged gate lines and data lines disposed between the liquid crystal layer 5 and the lower substrate 2, so as to form a plurality of pixel units arranged in array and the common electrode 3 forms common electrode units each of which corresponds to one of the pixel units.

For example, the display panel is a display panel of ADS mode. Each common electrode unit is provided on the same layer with gate lines. A pixel electrode with a strip structure is disposed on a side of the common electrode 3 facing the liquid crystal layer 5.

The display device can also be a display device of IPS mode.

As illustrated in FIG. 2, FIG. 3 and FIG. 4, a display device is provided in the embodiment of the present invention. The display device can include the display panel according to any one of the above embodiments.

As illustrated in FIG. 2, FIG. 3 and FIG. 4, in some embodiments, the lower substrate 2 of the display panel can be a light-guide plate. Under such case, a reflection plate 9 is disposed on a side of the lower substrate 2 facing away from the upper substrate 1, and a lamp strip 10 is disposed on at least a side face of the lower substrate 2. With the lower substrate 2 being as a light-guide plate, numbers of layers in the structure of a display device can be reduced and the display device can be made thinner.

What are described above is related to the illustrative embodiments of the disclosure only and not limitative to the scope of the disclosure. The scopes of the disclosure are defined by the accompanying claims.

This application claims the benefit of Chinese patent application No. 201410850930.6 filled in China on Dec. 30, 2014, which is incorporated by reference herein as a part of this application.

The invention claimed is:

1. A display panel, comprising:
   an upper substrate and a lower substrate disposed opposite to each other;
   a liquid crystal layer provided between the upper substrate and the lower substrate; and
   a common electrode disposed on a side of the liquid crystal layer,
   wherein the common electrode has a wire gating polarizing structure that forms a polarizer structure, the common electrode is provided on a side of the liquid crystal layer facing the lower substrate and forms the polarizer structure, the display panel further comprises an antistatic layer disposed on a side of the upper substrate facing away from the lower substrate, and the antistatic layer has a wire gating polarizing structure that forms a polarization analyzer structure.

2. The display panel according to claim 1, wherein the display panel further comprises an array layer and a color film layer, wherein:
   the color film layer is provided between the common electrode and the liquid crystal layer, the array layer is provided between the upper substrate and the liquid crystal layer; or,
   the color film layer is provided between the liquid crystal layer and the upper substrate, the array layer is provided between the common electrode and the liquid crystal layer; or,
   the color film layer is provided between the liquid crystal layer and the upper substrate, the array layer is provided between the color film layer and the liquid crystal layer.

3. The display panel according to claim 1, further comprising a plurality of crossly arranged gate lines and data lines provided between the liquid crystal layer and the lower substrate so as to form a plurality of pixel units arranged in array, and the common electrode forms common electrode units each of which corresponds to one of the pixel units.

4. The display panel according to claim 3, wherein each of the common electrode units is disposed on a same layer with the gate lines; a pixel electrode with a strip structure is disposed on a side of the common electrode facing the liquid crystal layer.

5. The display panel according to claim 1, wherein the common electrode is disposed between the liquid crystal layer and the lower substrate.

6. A display device, comprising the display panel according to claim 1.

7. The display device according to claim 6, wherein the lower substrate of the display panel is a light-guide plate; a reflection plate is disposed on a side the lower substrate facing away from the upper substrate and a lamp strip is disposed on at least a side face of the lower substrate.

* * * * *